United States Patent [19]

Bauer

[11] Patent Number: 5,232,115
[45] Date of Patent: Aug. 3, 1993

[54] REMOVABLE CLOSURE FOR A TUBULAR OPENING

[75] Inventor: Sascha Bauer, Auenwald, Fed. Rep. of Germany

[73] Assignee: Filterwerk Mann+ Hummel GmbH, Ludwigsburg, Fed. Rep. of Germany

[21] Appl. No.: 567,175

[22] Filed: Aug. 14, 1990

[30] Foreign Application Priority Data

Aug. 18, 1989 [DE] Fed. Rep. of Germany ....... 3927325

[51] Int. Cl.⁵ .............................................. B65D 41/06
[52] U.S. Cl. ................................... 220/293; 220/256; 220/295; 220/373; 220/DIG. 32; 220/DIG. 33
[58] Field of Search ............... 220/293, 254, 255, 256, 220/298, 300, 304, 373, DIG. 32, DIG. 33

[56] References Cited

U.S. PATENT DOCUMENTS

| | | | |
|---|---|---|---|
| 2,145,739 | 1/1939 | Shaw | 220/256 |
| 3,067,907 | 12/1962 | Friend | 220/293 X |
| 3,386,611 | 6/1968 | Crute | 220/304 X |
| 3,415,410 | 12/1968 | Franchini | 220/44 |
| 3,516,569 | 6/1970 | Goes | 220/304 X |
| 3,921,849 | 11/1975 | Fernberg et al. | 220/295 |
| 4,136,795 | 1/1979 | Crute et al. | 220/203 |
| 4,294,375 | 10/1981 | Gerdes | 220/293 |
| 4,336,890 | 6/1982 | Moehlmann | 215/272 |
| 4,376,492 | 3/1963 | Bartel et al. | 220/293 X |
| 4,494,669 | 1/1985 | Villeval | 220/204 |
| 4,666,057 | 5/1987 | Come | 220/368 |

FOREIGN PATENT DOCUMENTS

| | | |
|---|---|---|
| 20987 | 1/1981 | European Pat. Off. . |
| 1948227 | 10/1966 | Fed. Rep. of Germany . |
| 1757248 | 5/1971 | Fed. Rep. of Germany . |
| 2113106 | 9/1972 | Fed. Rep. of Germany . |

Primary Examiner—Stephen P. Garbe
Assistant Examiner—Vanessa Caretto
Attorney, Agent, or Firm—Foley & Lardner

[57] ABSTRACT

A cap for closing a tubular opening, especially the opening of an oil filler tube, which cap comprises a first part or cover part 12, which can be attached to the tubular opening by a bayonet lock, and a second part provided as an inside part 13, which is freely rotatable on the cover part 12 and is attached to the cover part 12 by a snap fastener 22. On the inside part 13 is a gasket 14 which seals the tubular opening. Sliding contact surfaces 20, 21 are provided between the inside part and the outer cap, so that no shearing forces act on the inside part or on the gasket when the tubular opening is closed or opened, thereby substantially facilitating the closing and opening of the tubular opening.

5 Claims, 2 Drawing Sheets

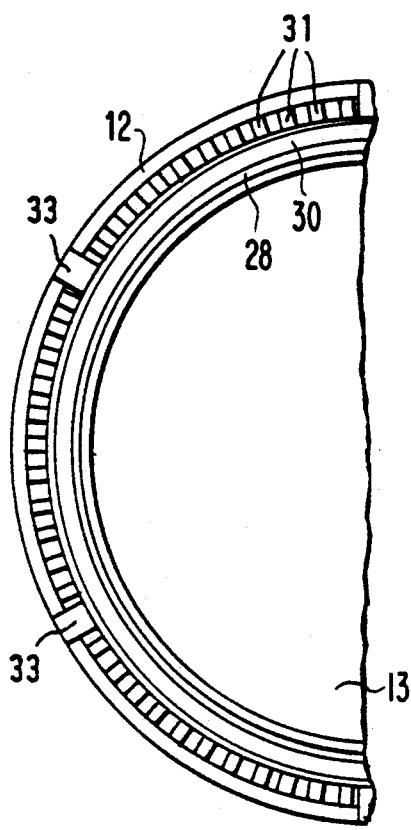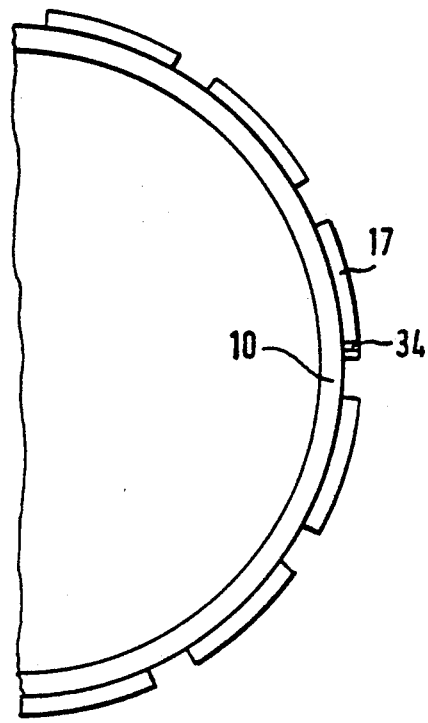
FIG.3a    FIG.3b
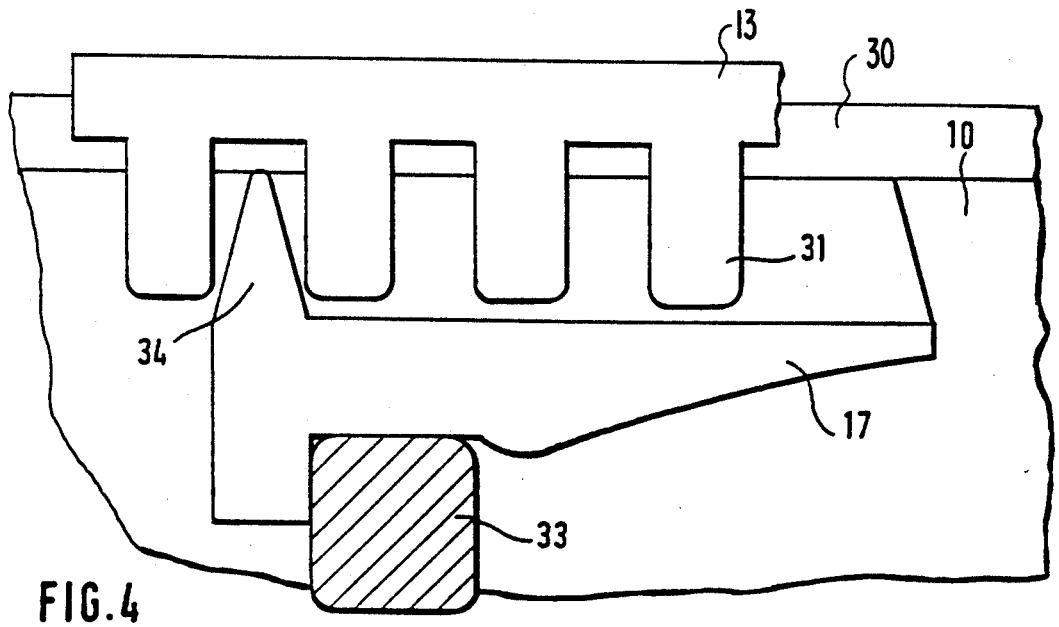
FIG.4

REMOVABLE CLOSURE FOR A TUBULAR OPENING

BACKGROUND OF THE INVENTION

This invention relates to a removable closure for a tubular opening, such as an oil filler tube, comprising a cover part fastened by a bayonet lock to said tubular opening, and a gasket of rubber or rubber-like material for sealing the opening.

It is known to provide a cap for closing a fuel tank with a bayonet lock. The same principle can also be applied to other kinds of tubular openings, such as filler tubes for lubricating oil. Usually the cap has a gasket to assure leak-proof sealing of the opening.

It has been found that particularly in the case of closures which are opened only very rarely, the gasket, which normally consists of rubber, adheres very tightly to the sealing surface of the tubular opening. Even where the gasket is wetted with oil, for example in the case of an oil filler tube, it still sticks to the oil filler tube which may, for example, be formed of plastic material. As a result of the adhesion of these parts to one another, it becomes impossible, or possible only with extreme difficulty, to release the cap, since the adhesion must be overcome by shearing forces applied by turning the cap.

European Patent No. EP 00 20 987 discloses a closure in which a cup-shaped cap is provided whose free inside diameter corresponds to the outside diameter of the opening to which it is to be applied. To close the opening the cup-shaped cap is reduced in diameter by a constricting device which consists of radially acting thrusters that are brought from an initial position to a locked position by rotating a collar. The opening is opened by rotating the collar in the opposite direction, causing the thrusters to return to the initial position and releasing the cap. A disadvantage of this type of closure, however, is that polymer film hinges are necessary for imparting the radial motion to the thrusters, and they can easily be damaged by improper handling. There is also the danger that, at very high and very low ambient temperatures, the operational reliability of the closure may be impaired due to the properties of the plastic.

SUMMARY OF THE INVENTION

It is therefore the object of the invention to provide a closure having a rugged construction, which can easily be opened even after a long period of time in which the closure has not been operated.

These and other objects of the invention are achieved by providing a removable closure for closing a tubular opening comprising a cover part, a bayonet lock for fastening said cover part over said tubular opening, an inside part rotatably mounted concentrically in said cover part such that a supporting surface on said inside part bears axially against a supporting surface on said cover part, and a gasket of rubber or rubber-like material secured to said inside part for sealing said opening.

The invention is characterized by an uncomplicated construction which, due to its simplicity, is reliable in operation, both as regards the sealing of the tubular opening and as regards the easy and problem-free opening of the closure.

By providing an inside part which can be rotated with respect to the cover part, the rotatory movement of the cover part is uncoupled from the axial sealing action. This means that the gasket, which assures reliable sealing by its axial pressure alone, no longer has to be rotated against the sealing surface, which would cause it to rub against the gasket.

Between the inside part and the cover part there are bearing surfaces for the transfer of the axial forces. These bearing surfaces can be, for example, one or more annular surfaces having good sliding properties. It is also possible to insert a slip ring between the bearing surfaces to facilitate the sliding action.

Particularly the use of thermoplastic both in the cover part and in the inside part has a very positive effect on the sliding properties, i.e., the cover part slides on the inside part when the closure is applied by means of the bayonet lock, without any danger that the inside part will be moved by the rotation of the cover part. Furthermore, the relatively high coefficient of friction between the gasket and the tubular opening and between the gasket and the inside part contributes to retention of the inside part in its position relative to the tubular opening.

In accordance with a further embodiment of the invention the inside part is provided with a snap fastener and can be snapped into the cover part. Thus the inside part is fixedly attached to the cover part. The snap fastener is configured such that it is possible to vent the tubular opening, yet the escape of liquid, for example oil, is effectively prevented up to a particular angular position. In accordance with a further embodiment, a labyrinth seal can be provided between the outside cover and the inside part to improve the liquid blocking action. This labyrinth seal is advantageously provided with a liquid return opening. In this manner, when the closure is used on an oil filler tube, it is assured that oil cannot escape through the vent.

If it is not desired to vent the interior space, the inside part can, of course, also be configured as a completely liquid-tight covering plate.

In accordance with a further embodiment of the invention, it is also possible to provide an interlocking connection between the tubular opening and the inside part to keep the inside part in position. For this purpose the opening has a projection. The inside part is in this case provided with teeth which are brought into engagement with the projection when the closure is placed on the opening. This configuration of the invention is desirable when the use of a gasket of special material does not assure that the coefficient of friction between the gasket and the opening will be greater than the coefficient of friction between the inside part and the cover part.

An additional embodiment of the invention provides for sizing the inside part such that, when the closure is placed on the opening, it will be centered. This is achieved by forming the inside part with a greater axial length than the outside cover, so that the inside part will be the first to be engaged in the opening when the closure is set in place, and by means of its outside diameter it will center the closure on the tubular opening.

Additional advantageous embodiments are described in connection with the accompanying drawings.

BRIEF DESCRIPTION OF THE DRAWINGS

The invention will be described in further detail hereinafter with reference to illustrative preferred embodiments shown in the accompanying drawings in which:

FIG. 3a is a partial bottom plan view of the cap of FIG. 2, and FIG. 3b is a partial top plan view of the oil filler tube of FIG. 2, and of FIG. 2, and FIG. 4 is an enlarged partial perspective view showing the engagement between the cap and oil filler tube of FIGS. 2 and 3.

DETAILED DESCRIPTION OF PREFERRED EMBODIMENTS

Figure 1:
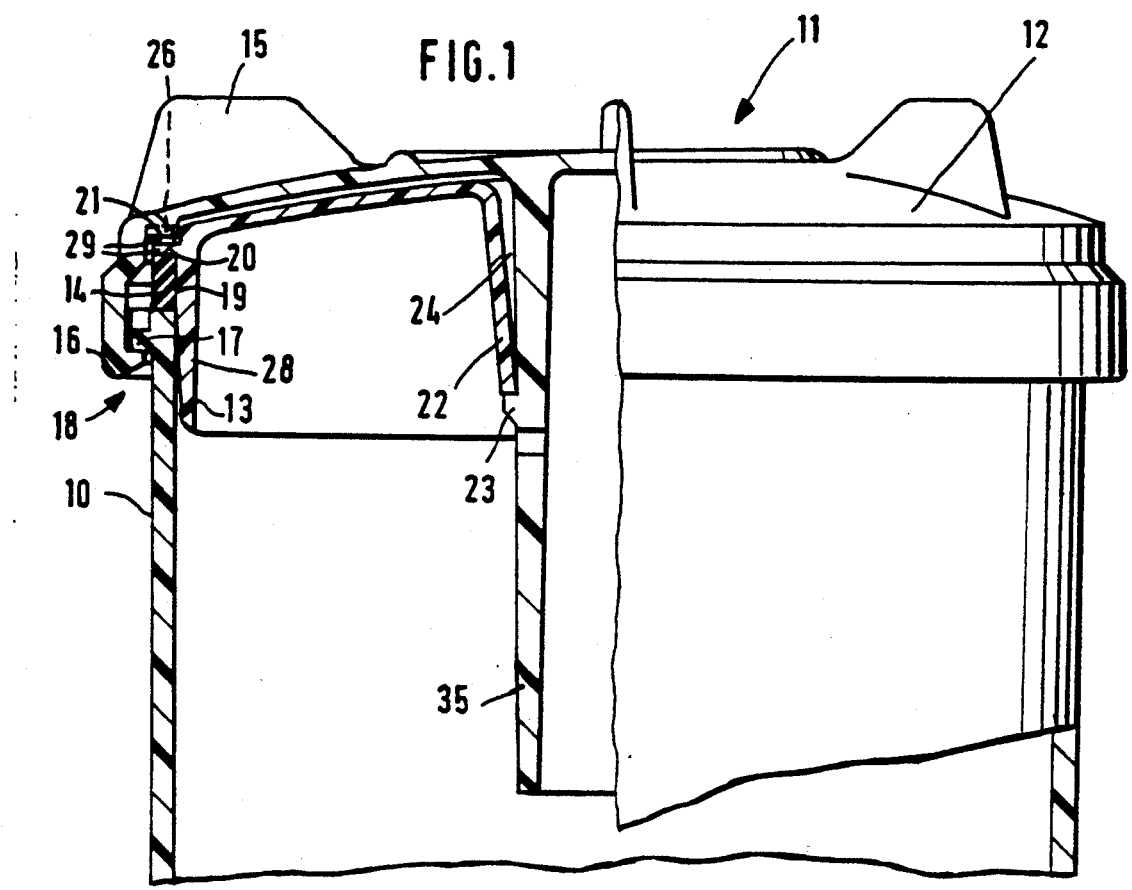
FIG. 1 is a side elevational view partial cross section taken through an oil filler tube cap in accordance with the invention.

The closure according to FIG. 1 serves to close an oil filler tube, especially to close the oil filler tube of the hydraulic fluid reservoir of the power steering of a motor vehicle. It is known that a cap of this kind is only opened at infrequent intervals to inspect the oil level. If, however, a closure of the kind that is commonly used is left closed for a very long time, adhesion between the gasket and the tube will increase to such an extent that the gasket placed directly on the cover will not permit the cap to be turned at all or will only permit the cap to be turned with the aid of tools. Even the effect of the oil present in the tube is unable to free the cap.

The closure shown in FIG. 1, on the other hand, can easily be opened, since the axial movement required is uncoupled from the rotational movement.

The drawing shows an oil filler tube or the upper end of a container 10. This oil filler tube 10 is closed with a cap 11 comprising a cover part 12, an inside part 13, and a gasket 14. The cover part 12 has grips 15 by which the cap can be held and rotated. Also, hook-like elements 16 are disposed on the outer periphery of the cover part to form the bayonet lock in conjunction with lugs 17. The inside part 13 bears on its outer periphery the gasket 14. This is formed, for example, of soft rubber, and is held in the axial direction on the inside part 13 by an annular surface 19. Above this annular surface 19 there is provided a sliding surface 20. This sliding surface 20 is in contact with a sliding surface 21 which is located on the cover part 12. Both the cover part 12 and the inside part are formed of glass fiber-reinforced polyamide material. This plastic has relatively favorable sliding properties and is therefore highly suitable for forming sliding surfaces.

The inside part 13 comprises a tapering tube 22 which is snapped over an abutment 23 on the cover part 12. This snap fastener may be either a releasable or a permanent attachment. Since the tapering tube 22 forms a narrow opening or gap with the cover part 12, any oil that might get into the intervening space 24 can flow back through the opening or gap between the tube and the cover part into the oil container.

To compensate for changes in air pressure, the air that is in the oil container is able to escape to the outside through this gap. To prevent air entrapment at the sliding surfaces 20 and 21, a further gap 26 is provided— shown here by a broken line. If desired, a slip ring 29 may be disposed between the sliding surfaces 21 and 22 to facilitate the sliding action.

In the figure shown here, the oil filler tube is closed by the cap 11. Rotation of the cover part 12 releases the bayonet lock 18. During this rotation the cover part 12 slides on the inside part 13 due to the sliding surfaces 20 and 21. During this rotary movement the inside part therefore remains in the position shown. Not until the cover part 12 is lifted is the inside part 13 lifted with it and the oil filler tube opened. It can thus be seen that no shearing forces act on the gasket 14. Furthermore, the adhesion of the gasket to the oil filler tube 10 does not have to be overcome by a rotational movement; instead it is overcome by a simple lifting off of the cap, which requires significantly less force.

The inside part 13 has on its outer periphery a wall 28, which extends relatively deeply into the oil filler tube, so that inside part 13 is longer in the axial direction of the tubular opening 10 than the hook-like elements 16 of the cover part 12. When the cap 11 is placed on the oil filler tube, this wall serves to center the cap, thereby preventing any canting or faulty locking of the bayonet closure.

Figure 2:
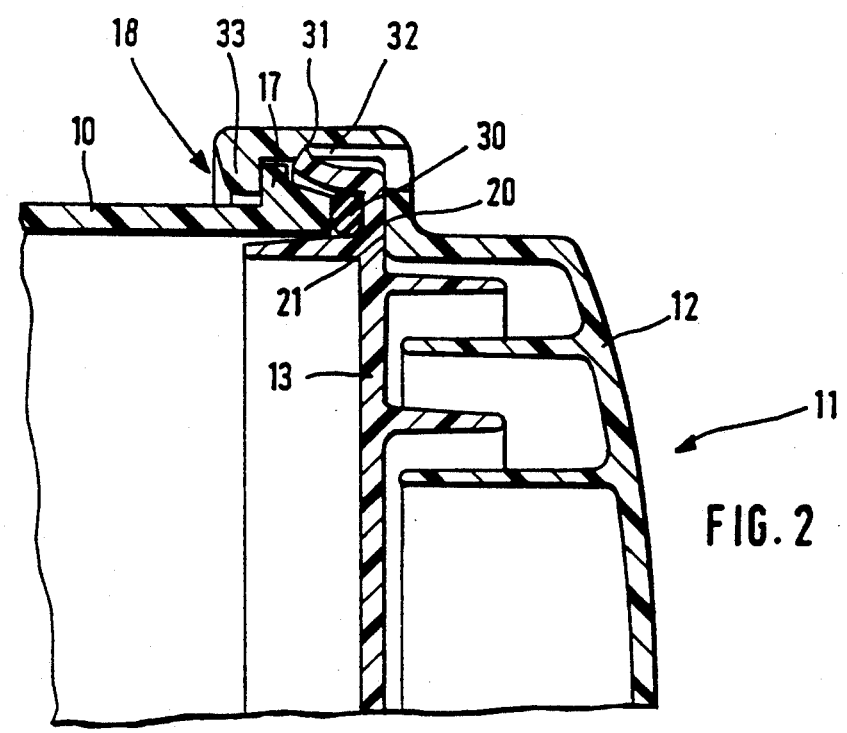
FIG. 2 is sectional partial view through a variant embodiment of the closure shown in FIG. 1 rotated 90° in the clockwise direction.

The closure embodiment shown in FIG. 2 also consists essentially of two parts, the cover part 12 and the inside part 13. The cover part 12 is here again fastened to the oil filler tube 10 with a bayonet lock. The cover part 12 is provided on its circumference with a gripping surface which assures the easy opening of the cap. A gasket in the form of an O-ring 30 is inserted into the inside part 13. Between the cover part 12 and the inside part 13 are found the sliding surfaces 20 and 21, which have diameters similar to that of the O-ring. It has been found desirable to configure the sliding surfaces in this diameter range since it is here that the axial force acts on the gasket. Consequently, excessive stresses on the plastic parts are avoided.

As shown in FIG. 2, a labyrinth seal is formed between the cover part 12 and the inside part 13 by a series of annular flanges on inside part 13 which overlap with a series of oppositely directed annular flanges on cover part 12 for hindering liquid from entering between the cover part and the inside part.

As shown in FIG. 3a, the inside part 13 is provided with outwardly pointing teeth 31. These teeth are formed as snap elements, and when the inside part is inserted into the cover part 12, they catch in a circumferential groove 32 in the cover part. To enable the inside part 13 to be assembled in spite of the lugs 33 of the cover part, which form part of the bayonet lock, a number of gaps are left between the teeth as shown in the drawing.

FIG. 3b is a top view of the oil filler tube 10 with the lugs 17 of the bayonet lock. At a point on the circumference of the oil filler tube there is a wedge-shaped element 34. In a detail shown in FIG. 4, this wedge-shaped element 34 is easily seen as a part of one lug 17. If the cap 11 is placed on the oil filler tube 10, the teeth 31, as shown in FIG. 4, will straddle the element 34, so as to constitute an additional means of preventing rotation of the inside part 13.

To monitor the level of the oil in the oil reservoir, an electrical level measuring device can be disposed in the cylindrical stem 35 of the cover part 12. The signal from this measuring device can be carried by a cable to an indicator device.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all modifications falling within the ambit of the appended claims and equivalents thereof.

What is claimed is:

1. A removable closure for closing a tubular opening comprising a cover part, a bayonet lock for fastening said cove part over said tubular opening, an inside part (13) rotatably mounted concentrically in said cover part (12) such that a supporting sliding surface on said inside part bears axially against a supporting sliding surface on said cover part, and a gasket (14) of rubber or rubber-like material secured to said inside part for sealing said opening, wherein a labyrinth seal is formed between said cover part (12) and said inside part (13) for hindering liquid from entering between said cover part and said inside part, and wherein said inside part (13) has a liquid return opening facing the tubular opening (10).

2. A removable closure according to claim 1, wherein said tubular opening (10) carries at least one wedge-shaped element (34) and said inside part (19) has teeth (31) which engage said wedge-shaped element when said closure is placed over said opening (10), said wedge-shaped element and engaging teeth preventing said inside part from rotating when the bayonet lock is operated.

3. A removable closure for closing a tubular opening comprising a cover part, a bayonet lock for fastening said cover part over said tubular opening, an inside part rotatably mounted concentrically in said cover part such that a supporting sliding surface on said inside part bears axially against a supporting sliding surface on said cover part through an interposed slip ring disposed between said supporting sliding surfaces to facilitate sliding, and a gasket of rubber or rubber-like material secured to said inside part for sealing said opening, wherein said inside part has on its outer periphery an annular wall which is longer in the axial direction of the tubular opening than the cover part, and the length of said wall of said inside part extending beyond said cover part forms a guide surface for centering said cap on said tubular opening.

4. A removable closure according to claim 3, wherein said inside part (13) is attached to said cover part (12) by a snap fastener (22).

5. A removable closure according to claim 3 wherein said inside part (13) has a liquid return opening facing the tubular opening (10).

* * * * *